United States Patent
Curtis (10) Patent No.: US 8,793,574 B2
(45) Date of Patent: Jul. 29, 2014

(54) METHODS AND SYSTEMS FOR IDENTIFICATION AND TRANSCRIPTION OF INDIVIDUAL ANCESTRAL RECORDS AND FAMILY

(75) Inventor: Donald B. Curtis, Provo, UT (US)

(73) Assignee: Ancestry.com Operations Inc., Provo, UT (US)

( * ) Notice: Subject to any disclaimer, the term of this patent is extended or adjusted under 35 U.S.C. 154(b) by 66 days.

(21) Appl. No.: 13/049,671

(22) Filed: Mar. 16, 2011

(65) Prior Publication Data

US 2012/0240038 A1 Sep. 20, 2012

(51) Int. Cl.
*G06F 17/24* (2006.01)
*G06F 17/27* (2006.01)
*G06F 17/30* (2006.01)

(52) U.S. Cl.
USPC ........... 715/256; 715/221; 715/222; 715/224; 715/226

(58) Field of Classification Search
CPC ...................... G06F 17/30289; G06F 17/30011
USPC ................... 715/221, 222, 224, 226, 254, 256
See application file for complete search history.

(56) References Cited

U.S. PATENT DOCUMENTS

| | | | |
|---|---|---|---|
| 6,570,567 B1 * | 5/2003 | Eaton | 345/428 |
| 8,356,023 B2 * | 1/2013 | Graham et al. | 707/706 |
| 2004/0095376 A1 * | 5/2004 | Graham et al. | 345/716 |
| 2008/0033933 A1 * | 2/2008 | Cookson et al. | 707/5 |
| 2008/0288886 A1 * | 11/2008 | Sherwood et al. | 715/772 |
| 2011/0072009 A1 * | 3/2011 | Tuttle et al. | 715/854 |
| 2011/0197119 A1 * | 8/2011 | Ye et al. | 715/226 |
| 2012/0045150 A1 * | 2/2012 | Brummer et al. | 382/321 |

* cited by examiner

*Primary Examiner* — Doug Hutton, Jr.
*Assistant Examiner* — Ariel Mercado
(74) *Attorney, Agent, or Firm* — Kilpatrick Townsend & Stockton LLP (57) ABSTRACT

Systems and methods for receive one or more document comprising genealogical or ancestral information and generating an electronic version of the document. Extracting genealogical or ancestral information from one or more documents and associate information extracted from the document(s) with one or more data fields of a genealogical record. Displaying the electronic document simultaneously with a plurality of genealogical or ancestral records that includes information about individuals, and a hierarchical structure describing a relationship between individuals.

15 Claims, 7 Drawing Sheets

METHODS AND SYSTEMS FOR IDENTIFICATION AND TRANSCRIPTION OF INDIVIDUAL ANCESTRAL RECORDS AND FAMILY

BACKGROUND OF THE INVENTION

The present invention relates generally to methods and systems for extracting information from one or more documents and more specifically to methods and systems for extracting information from one or more document to create records, such as ancestral or genealogical records.

Records are often kept by individuals and organizations to track and/or store pieces of information. The information found in records is often obtained form various documents. For example, a company may maintain a database that includes a record of sales of one or more products. The sales information that is maintained in the database may be obtained from sales receipts of the products. Another common type of record that is created and/or maintained is ancestral or genealogical records where an individual stores information about themselves and/or family members. These records typically include relationship information between sub-records or individuals so that the individuals in the record are interconnected. These records may include other information as well, such as date of birth, date of death, date of marriage, city and/or state of residence, spouse, children, and other information.

The information is often obtained from various documents, such as birth certificates, death certificates, newspaper clippings, books, census records, immigration records, etc. The information maintained in these ancestral records is often manually entered into the record from one of these sources, such as by having an individual observe documents and manually input the information into the record. Inputting the information may include typing the information on a keyboard, printing the information by hand, and the like. Manually entering information into a record in this way is prone to several errors. For example, the person observing the information may incorrectly associate information, such as incorrectly associating familial relationship or misplacing/switching the date and month of an event. The information is also susceptible to spelling or grammar errors. Manually entering information for long periods may lead to fatigue, which may increases the likelihood of errors. In addition, the speed at which a record may be created is usually limited to the speed at which the person entering the information can type or print. For these and other reasons, there is a need in the art for improved ways to create records.

BRIEF SUMMARY OF THE INVENTION

The present invention provides systems and methods for extracting information from a document and creating a record from the extracted information. According to an embodiment of the invention, a method for extracting genealogical information from one or more documents may include providing a document having text that includes genealogical data. The method may also include converting the text into a machine readable format. The method may further include displaying the document with the text in the machine readable format and displaying one or more data fields associated with a genealogical record of an individual. Each of the data fields may be configured to store information about the individual.

The method may additionally include receiving a selection of a first portion of text from the document, where the first portion of text comprises information about the individual. The method may additionally include highlighting the first portion of text on the document and extracting information associated with the first portion of text from the document. The method may additionally include receiving a selection of a data field to associate with the extracted information and populating the data field with the extracted information.

The method may additionally include receiving relationship information that identifies a relationship between the individual and an additional individual and linking the individual with the additional individual according to the relationship. Converting the text into machine readable format may include determining individual characters of the text, determining a word or phrase composed of and/or including the individual characters, and defining an area around the word or phrase to form a selectable region on the document. Receiving a selection of the first portion of text may include receiving a selection of the selectable region. The method may additionally include receiving a selection of a second portion of text, determining that the second portion of text includes information generally associated with data field categories, and generating an additional data field based on the second portion of text.

An image of the document, and/or the document itself, may be associated with the record. The coordinates of the first portion of text in relation to the image may be stored. The extracted information in the data field may be linked with the coordinates of the first portion of text in the image and the image may be stored with the record to provide a source of the extracted information in the data field(s). The stored image may be provided and the first portion of text may be highlighted on the image when the extracted information in the data field is selected and/or a request to view the source of the extracted information is received. The highlights on the image may visually display the source of the extracted information. The method may additionally include normalizing the extracted information so that the information comprises a defined format for the selected data field. The methods described herein may be executed by a computer having a computer-readable medium with a set of instructions stored thereon. The instruction may cause the computer to perform the methods steps described.

In addition, the record could be associated with one or more citations that reference information from a book (e.g., author, publication information, repository, etc), and/or the page number(s) of the book containing the data. As mentioned previously, the particular coordinates of the information on the page(s) could also be stored. One or more fields of a record may include data sourced from several pages of one or more books and each field may include one or more citations that provide the source(s) of the information for that field. A record and/or data field could also include multiple alternative data values that provide the same or similar information (e.g., the name Tom, Tommy, Thomas, etc.). Each value could be recorded as an alternative value in a field or multiple fields and may have its own citation.

According to another embodiment, a method for providing a searchable document over a network may include providing a document comprising text and reading the document. The method may also include determining individual characters of the text; determining a word comprised of the individual characters, and defining an area around the word to form a selectable region associated with the word on the document. The method may further include receiving, via the selectable region, a selection of the word and associating the word with a category, where the word and category facilitate in locating the word during a search over the network. The method may additionally include storing the document on a database and receiving a search query from a first user performing the search over the network. The search query may include search information. The method may additionally include determining a correlation between the search information and the word and category, displaying the document to the user, and highlighting the selectable region associated with the word to display the word to the user.

Associating the word with a category may include displaying the document with the text in the machine readable format to a second user. Associating the word with a category may also include displaying to the second user one or more data fields, where each data field may be associated with a corresponding category. Associating the word with a category may further include receiving, from the second user, the selection of the word and receiving from the second user, a selection of a data field to associate with the word.

DETAILED DESCRIPTION OF THE INVENTION

The present invention provides systems and methods for creating records and relationships between records. More specifically, the present invention provides systems and methods that may be used to extract information from one or more documents, such as pages in a book, and/or associate information extracted from the document(s) with one or more data fields of a record. Further, the present invention provides systems and methods for providing searchable documents over a network. The record may be any type of record. For example, in one embodiment, the record may be an ancestral or genealogical record that includes information about individuals and family members or relatives, both living and/or deceased. In other embodiments, the record may include sales records, employment records, public records, school records, or any other type of record. The record may be created and/or maintained by individuals, organizations, corporations, companies, groups, etc. The system may include various networks, computers, applications, and the like. Likewise, the methods may be performed on stand alone computers, such as a laptop or desktop computer, may be accessed and/or operated over one or more networks, such as the Internet, may be maintained by one or more organizations, and the like.

Figure 1:
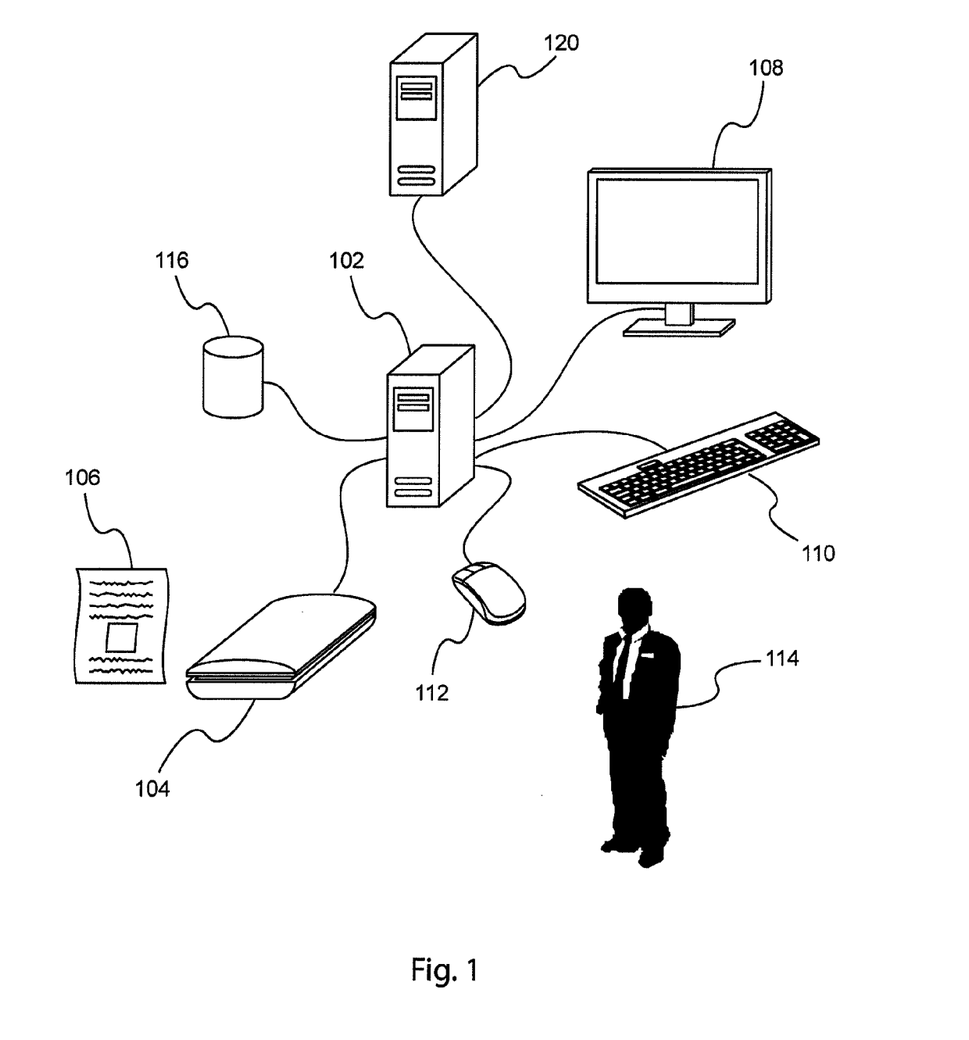
FIG. 1 is a schematic of a system that may be used to extract information from a document and create a record according to an embodiment of the invention.

With reference to FIG. 1, illustrated is a simplified schematic of a system that may be used to perform the methods and operations described herein. For example, the system may be used to extract information from a document and create a record. The system may also be used to provide searchable documents over a network. The system may include a central computing system 102. The central computing system 102 may be a any type of computer operated by an individual, such as a personal home computer or laptop, or may be a component of a larger computing system, such as a server operated by a corporation or company. In one embodiment, the central computing system 102 may include a communications interface (not shown), a processor (not shown), and/or a memory device (not shown) as described in FIG. 7 to perform the operations and methods described herein. For example, the central computing system 102 may display a user interface (not shown, but see FIG. 3) that enables a user to perform one or more functions to extract information from a document and create a record from the extracted information.

According to another embodiment, the central computing system 102 may be communicatively coupled with an additional computing system 120 (e.g., a computer or server) so that a user interface is provided to computing system 102 over a network from additional computing system 120. Similarly, additional computing system 120 may be communicatively coupled with a database (not shown) that stores documents so that other computing system, such as computing system 102, may perform searches over a network. For example, additional computing system 120 may be operated by a company that renders documents searchable and/or maintains a database of searchable documents. The company may provide the searchable documents to the public over a network so that individuals may search the company's database for various information. In one embodiment, the searchable documents and/or database comprises genealogical or ancestral records. In another embodiment, the searchable documents and/or database comprises company information (sales records, employment records, etc.) and the search over a network is entirely internal to the company.

The central computing system 102 and/or additional computing system 120 may be communicatively coupled with various hardware. For example, FIG. 1 illustrates the central computing system 102 communicatively coupled with a database 116, a display device 108, a keyboard 110, a mouse 112, and a document input device 104, such as a scanner or photocopier. One or more of the various hardware components could be communicatively coupled with the central computing system 102 via a network. The database 116 may be a remote database or may be internal to the central computing system 102. The database 116 may store information and/or instructions for performing the methods described herein. For example, the database may store information about a document 106 that is provided to the central computing system 102. The information may include machine readable text, one or more selectable regions associated with words or phrases of the text, highlighted portions of the text, associations between the text and categories and/or data fields, associations between documents and records, etc. In addition, the database 116 may store one or more records. The records may be any type of record including personal records, such as genealogical or ancestral records, and/or company records. The database 116 may be searchable so that individuals and/or organizations can search for information from a document and/or record as previously described. The database 116 may further include character recognition instructions (i.e., OCR software) to read and convert a document 106 in non-machine readable format to a machine readable format.

The display device 108 may be any type of device for displaying visual information to a user 114, such as a LCD display, plasma display, CRT display, etc. The display device can provide a user 114 interface to a user so that the user can select text from a document 106 and thereby extract information form the document and create a record. The display device can also display one or more websites so that a user 114 can input a search query and thereby search one or more databases as previously described. Keyboard 110 and/or mouse 112 can allow the user 114 to provide input to the central computing system 102 and/or additional computing system 120. The input information may include a selection of text to extract from a document 106 and/or a selection of one or more data fields to associated with the selected text. The keyboard 110 and/or mouse 112 may also allow the user 114 to key in (i.e., type) information into a record and/or document. The document input device 104 may allow the user 114 to provide a document to the central computing system 102 and/or additional computing system 120 so that information may be extracted from the document 106 and a record created therefrom. The document input device may be a scanner, photocopier, camera, and/or any other device capable of providing a document to a computing system.

As briefly mentioned previously, the hardware may be communicatively coupled with central computing system 102 so that the central computing system is capable of performing the operations and methods described herein on its own; or the hardware may be coupled with additional computing system 120 so that a user 114 is able to perform the operations and methods described herein on central computing system 102 over a network. Further, the system may include a combination of both the central computing system 102 and additional computing system 120 so that various operations and methods are performed on each computing system.

Figure 2:
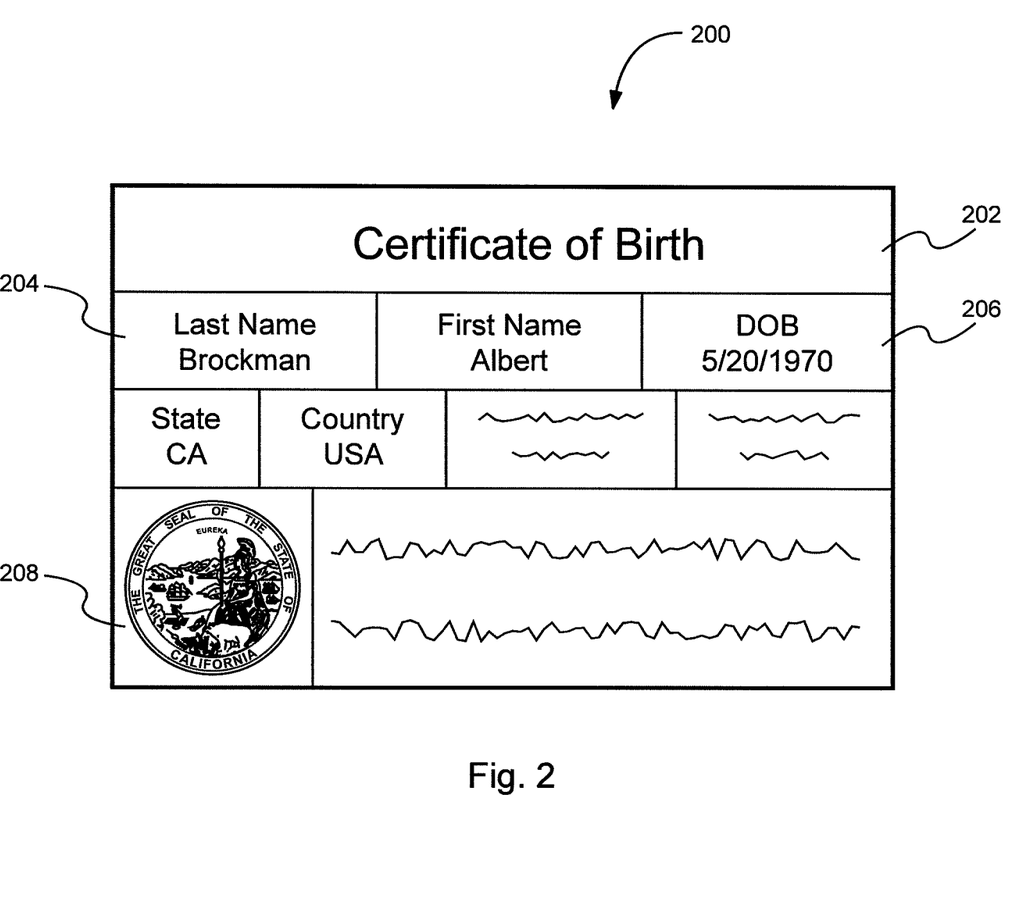
FIG. 2 is a view of a document that may include information to be entered into a record according to an embodiment of the invention.

With reference to FIG. 2, illustrated is a document 200 that may be provided to central computing system 102 and/or additional computing system 120 via document input device 104 so that information may be extracted from the document and a record created therefrom. The document 200 may be any type of document, such as a book, a death certificate, a birth certificate, a census record, a article, one or more notes, a public record, employee record, sales record, etc. The document 200 may include information about an individual or the information may be related to a company or organization. The document 200 may include a title 202 that identifies the type of document. For example, the document illustrated in FIG. 2 comprises a certificate of birth title 202 to show that the document 200 includes information related to the birth of the specified individual. The document 200 may also include information identifiers 204 that identify the information in a part of the document. For example, FIG. 2 shows the document including a last name field 204 that identifies that the information in that field includes the last name of the identified individual.

In other embodiments, the document might contain non-structured prose so that the information within the document is identifiable (e.g., an individual's date of birth) mainly by its relationship with the other information in the document (e.g., the date is provided in a paragraph describing the individual's birth). Such non-structured prose may render automated extraction of the information difficult. Embodiments of the present invention provide means for quickly and easily extracting such information (structured and/or non-structured) and structuring the information based on its relationship with the other information (e.g., associating the information with structured data fields).

The text in the document 200 may also include dates 206 that show when the document was created and/or when an event occurred, such as a date of birth of an individual. The dates 206 could also relate to a sales order or some event related to a company or organization. The document 200 may include authentication indicia 208, such as a seal or stamp, that verifies the authenticity of the document. The authenticity of the document may be important if questions related to the validity of the information within the document arise, such as when the information within separate documents differs. For example, in a genealogical record, the date of birth of an individual in a birth certificate may differ from the date of birth of the same individual in a family history book. In such instances, the authenticity indicia 208 may be relied upon to verify the date of birth information in the birth certificate, or in other words, may be relied upon to show that the birth certificate is likely not fraudulent.

Figure 3:
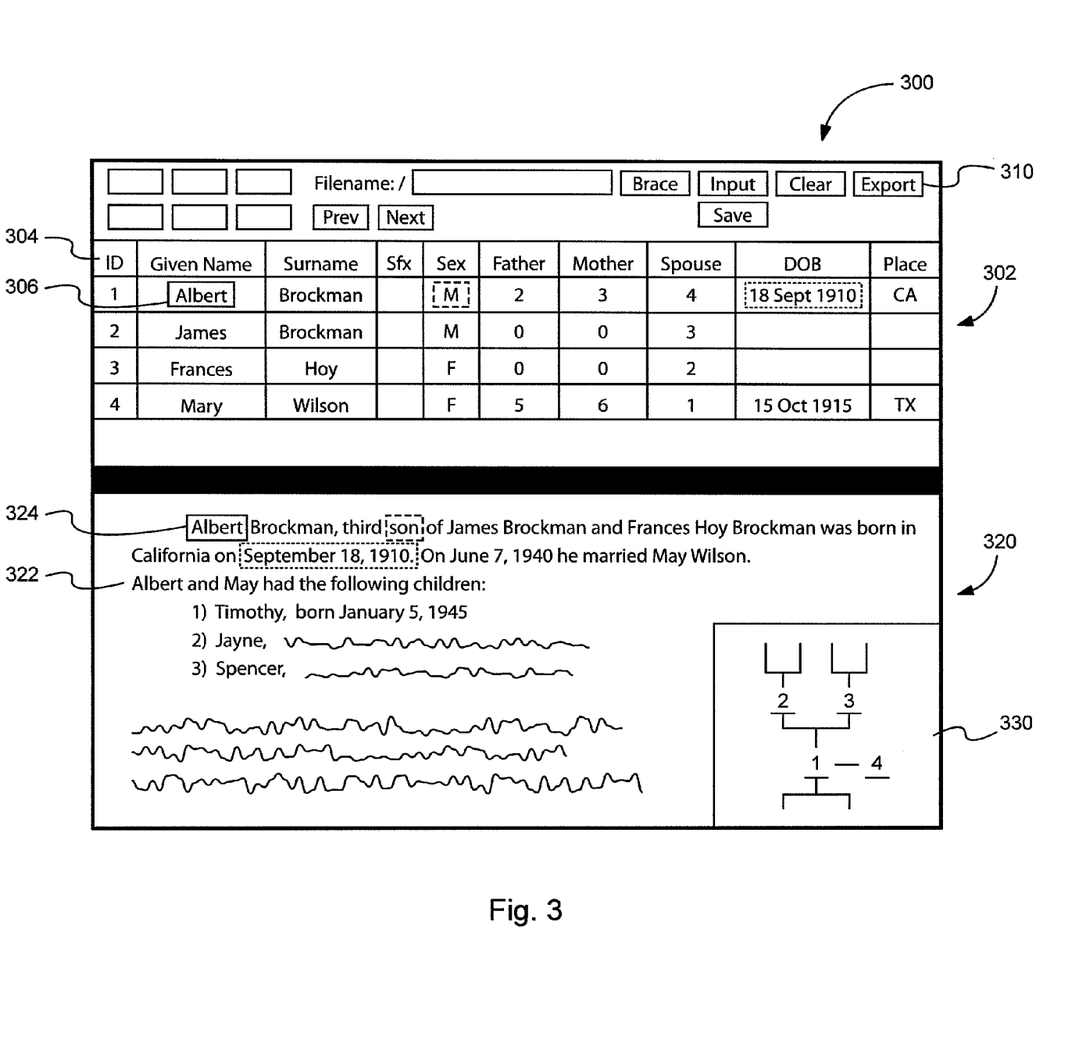
FIG. 3 is a view of a user interface that displays a record comprising a plurality of data fields and a document comprising information about an individual according to an embodiment of the invention.

With reference to FIG. 3, illustrated is a user interface 300 that may be provided to a user 114 from a central computing system 102 and/or additional computing system 120 that allows the user to extract information from a document 106, 200, 320 and create a record therefrom. According to one embodiment, such as the embodiment depicted in FIG. 3, the user interface 300 may include a split screen display with a record 302 displayed on a top half of the split screen display and a document 320 displayed on the bottom half of the display. The document 320 displayed may be any type of document, such as a book page having non-structured or structured prose or text. The non-structured prose may render automated extraction of information difficult. Embodiments of the present invention may facilitate in the extraction of such information thereby making extraction easier.

Document 320 may be a digital representation of an image from a source document from which information may be transcribed. According to another embodiment, the user interface 300 may include separate displays for one or more records 302 and/or for one or more documents 320. For example, the user interface 300 may include separate displays (e.g., separate windows) or a single display (e.g., single window) for two records that are being created or populated simultaneously and/or may include separate or single displays for two documents from which information is being extracted. The user interface's display 300 may be alterable by a user to suit the user's preference, such as, for example, alterable between a single display and multiple displays.

The record 302 displayed on the user interface 300 may include a plurality of data fields 304 that are configured to store information. The data fields generally relate to categories of information; for example, the data fields may include an ID field that indicates the identification of a sub-record, a given name field that indicates the given name of an individual, a surname field that indicates the surname of an individual, a suffix field that indicates whether the individual's name includes a suffix, a sex field that indicate the individual sex, a date of birth field, birth place field, etc. A person skilled in the art will recognize that additional data fields are possible depending on the record type, such as purchase price field, purchase date field, employee name field, employee number field, etc. Further, the data fields may include a non-standard field(s) and/or a user created field(s), to capture any other information such as a information that is unique to individual records and/or unique to a specific document.

The data fields may also include fields that describe relationships between records, sub-records, and/or between the information within data fields. For example, in the case of genealogical or ancestral records, the data fields may include a father field that indicates a father-child relationship between records or sub-records, a mother field that indicates a mother-child relationship, a spouse field that indicates a marriage between individual, children field, etc. In other types of records, such fields may relate products records, employee records and performance records, sales records, school and public records, etc. Using such fields, relationships may be created directly between records, sub-records, and/or data fields.

In one embodiment, the ID field depicted in FIG. 3 may indicate individuals records that are being created simultaneously. For example, as depicted in FIG. 3, ID 1 may indicate a record associated with Albert Brockman that is being created from document 320, while IDs 2-4 indicate records for Albert Brockman's father, mother, and spouse, respectively, which are being created simultaneously from document 320. The user interface enables multiple records to be created without requiring a separate node or information entry window for each record. Each of these records may be divisible from one another so that a single record (e.g., record 1 for Albert Brockman) may be divided from among the other records and viewed, modified, or provided to another application, individual, computing system, etc. For example, in relation to a search over a network, if a user is searching for information about Albert Brockman from a database, record 1 could be divided from the other records and provided to the user without providing records 2-4 so that only the information relevant to the search is provided.

In another embodiment, the records 1-4 may be sub records of a larger record, such as a Brockman family history record and may or may not be divisible from one another. Each of the data fields may be associated or populated with information 308 extracted from the document 320. Similarly, each data field may be populated with one or more pieces of information from a plurality of documents. Additionally, information may be keyed into the data fields from input devices, such as keyboard 110 and mouse 112. For example, the information that is extracted from a document and populated in the data fields may include an individual's name, date of birth, familial relationship, etc.

Additionally, the user interface may include one or more function buttons (shown at the top of the user interface display of FIG. 3) that perform functions related to the record and/or document. For example, the function buttons may include a save button, an import button that allows one or more records and/or documents to be imported, a zoom button, a previous and next button that scrolls between records and/or documents, a browse button that allows a user to select a document from a database for extraction, and an export button 310 that allows the record and/or document to be saved in a format applicable to one or more applications. For example, a common genealogical or ancestral file format that is used to exchange genealogical data is a GEDCOM file. When the record involves a genealogical files, the export button 310 may save the record in the GEDCOM file format. The export button 310 may save the record in any other type of file or format as well, such as a pdf, docx, xlsx, xml, etc.

The user interface 300 may also include a record tree view 330 that shows relationship between data, records, and/or sub-records. For example, the record tree view 330 may show familial relationships between individuals within a family record. The view can be based on the selected individual. For example, the record tree view 330 depicted in FIG. 3 shows record 1 as the main record and shows parent records (2 & 3) branching off from record 1 as well as children records branching off from record 1. The main view may be changed by selecting a different record (e.g., record 2, 3, or 4). Other types of relationships that may be depicted in a record tree view 330 include regional sales records, products records, product version records, historical records, etc. The tree depicted in record tree view 330 may be modified in real time as information is added to a record and/or as records are created, such as when family records are added (e.g., grandparent, children, etc.) so that the tree grows and visually displays relationship information for newly added records. Such a display may assist in ensuring that the information entered into a record is correct by depicting in real time how the information relates or ties into already existing information. Further, the record 302 displayed in the user interface may be selected by selecting a branch or limb from the tree depicted in record tree view 330. Thus, a user may input information into a record by selecting the individual in the tree view.

As described above, the document 320 may include information 322 about one or more individuals. For example, the document 320 may include personal and/or familial information about an individual. FIG. 3 shows the document 320 containing information about Albert Brockman (e.g., birth date, marriage, etc.) and Albert Brockman's parents, spouse, and children. From this document 320, records 1-4 may be created and/or populated with information. Document 320 may be provided on user interface 300 after the document has been converted into machine readable text using a character recognition program, such as an OCR program. The program may recognize the text of the document 320 and determine or identify individual characters within of the text. The recognition program may define an area around each of the individual characters so that each of the individual characters becomes selectable (i.e., may be selected by an input device such as mouse 112). The recognition program may further determine individual words or phrases from the individual characters, such as the names "Albert" and "Brockman" and/ or the dates "Sep. 18, 1910." In one embodiment, the recognition program may determine a phrase, such as "third son of," which phrase is generally used to show a familial relationship between individuals.

The recognition program may define an area 324 around each of the words or phrases to form a selectable region proximate to each word and/or phrase and/or to provide a highlightable region around each word and/or phrase. Defining an area 324 around each word and/or phrase may include linking or associating the defined areas around each of the characters of the word or may include defining an area around each word separate from a step of defining an area around each character. The selectable region may be a rectangle that completely surrounds and encompasses each word or phrase. Information may be associated with each of the selectable regions so that upon receiving a selection of the selectable region, the information associated with that selectable region, such as text information, may be placed into memory of a computing device (e.g., central computing system 102 and/or additional computing system 120). The information associated with the selected region, and/or stored in memory, may then be populated into a pre-selected data field or a subsequently selected data field. In some embodiments, the information is not stored in memory, but is automatically populated into a pre-selected or subsequently selected data field. Selecting a selectable region may include receiving an input from a mouse 112, such as by a user 114 clicking on a word or a phrase of the document's text 322 displayed on display device 108 or may include a key stroke from a keyboard 110 when a cursor is adjacent to the word or phrase. The system may select the word or phrase by recognizing that a mouse pointer is within the boundaries of the selectable region (i.e., within the rectangle that encompasses the word or phrase).

Other forms of selecting the selectable regions are contemplated herein, such as receiving an input on a touch screen display from a user's finger or pen, receiving an input on a wireless device, receiving an input from a voice recognition application, etc.

The defined area 324 or region may be highlighted when the word or phrase is selected to provide a visual display of the information to be extracted from the document and/or to provide a visual display of the information that has been entered into a data field. Similarly, the data field and/or the information populated within the data field may be highlighted to show an association between the data field and/or information and the word or phrase selected from the document. For example, element 324 illustrates the area or region that may be defined around the name "Albert." This area may be highlighted along with the information "Albert" 306 that is populated in the "given name" data field for record 1 (highlighting shown by solid lines). Likewise, the word "son" may be highlighted (shown in dashed lines) along with the indicia "M" in the sex field (also shown in dashed lines) to show a correlation between the identified sex for record 1 and the information from the document 320. FIG. 3 also shows the date of birth field highlighted along with the birth date in the document 320 (both shown with dotted lines).

While FIG. 3 illustrates the text in the document 320 and the corresponding information in the data field highlighted with different line types, the highlighting may also include different color configurations so that the correlations and/or highlighting are visually enhanced. For example, the name "Albert" can be highlighted in orange in the data field and in the document 320, while the sex information (M and son) can be highlighted purple, and the birth date information is highlighted in green. Further, related information can be highlighted with similar but slightly different colors. For example, the date of birth information in both the data field and document 320 may be highlighted in dark green while the birth place information in the data field and document is highlighted in light green to show that the pieces of information relate to birth information. Likewise, the surname information can be highlighted in dark orange while the given name information is highlighted in light orange to show an association between the information (e.g., that the information relates to name information). Each data field and/or the information in the data field can be highlighted along with the corresponding text in the document 320 so as to provide a visual map of the source of all the information in the record from the document. In addition, each record or sub-record (i.e., record 1-4) may be highlighted to visually provide information. For example, in the record illustrated in FIG. 3, all male records may be highlighted in blue, whereas all female records may be highlighted in pink.

In addition, an image of the document and/or the document itself can be associated with and/or stored with the record to provide a source of the information in the document. Coordinates on the image corresponding with each of the words or phrases selected from the document may be stored so that upon selecting a data field or selecting information within the data field, the word or phrase on the image is highlighted to visually display the source of the information in the data field (i.e., to show where the information was extracted). In one embodiment, each selected word or phrase is highlighted and the highlighting is stored along with the coordinates of the word or phrase so that upon viewing the information in a data field, the image or document is provided with the words or phrases highlighted. In another embodiment, the highlights are hidden until the source for the information is requested (e.g., the name "Albert" is not highlighted until the user requests the source of information for the name). The user interface may display the image or document when a source button (not shown) is selected.

Further, each record and/or data field may be associated with a plurality of images and/or documents 320 and each of the images and/or documents may highlight the information associated with that record and/or data field. As such, reviewing and verifying the information in the record and/or data field may be quick and easy since the information may be highlighted in the corresponding image(s) and/or document(s). Thus, a user need not read the entire document to identify the source of the information. Likewise, when multiple images and/or documents are used as a reference for a single data field or a piece of information in a data field, the consistency or discrepancy between the reference information in the image and/or document may be quickly checked by highlighting the reference information in the image and/or document and determining whether the information is the same.

The image and highlighted words or phrases can be saved and exported in one or more different formats using the export button 310 to provide a source for the information as the record is exchanged and/or provided to other applications. Similarly, as reports from the record are generated and/or as the record is exported in a different format, the system may automatically generate citations to the source of the information for one or more pieces of information within the report. For example, if a report is generated about record 1 associated with the individual "Albert Brockman," the system may automatically generate a citation to the document 320 to provide a reference for the date of birth, sex, mother, father, etc. that may be included in the report. The system may be configured to automatically generate the report in compliance with one or more citation formats. Information about the document 320 (e.g., title, volume, edition, page number, etc.) may be provided to the system when the document is initially imported for extraction or after the extraction process is complete.

As the information is extracted from the document and populated into one or more data fields, the information may be normalized to correspond to a predefined format. For example, FIG. 3 illustrates the document 320 including the date of Sep. 18, 1910 (highlighted in dotted lines) as the birth date for Albert Brockman. If the user selects this date, such as by clicking on the date with a mouse pointer, the birth date information may be extracted from the document 320 and normalized into the format shown in the record of 18 Sep. 1910 (highlighted in dotted lines). Likewise, FIG. 3 illustrates the information associated with the text "son" as being normalized into the indicia "M" in the record. The system may recognize that the information associated with a specific word or phrase corresponds with a specific data field. For example, the system may recognize that the word "son" corresponds with a data field that identifies the sex of an individual. Likewise, the system may recognize that the phrase Sep. 18, 1910 corresponds with a date data field. Upon selecting these words or phrases, the system may automatically populate a data field or may suggest populating a specific data field. If the data field does not exist, the system may generate or create the data field or may inquire whether a data field should be created to capture the information. For example, if a data field related to an individual's sex does not exist and the word "son" or phrase "the son of" is selected, the system may automatically generate a sex data field or inquire about creating such a data field. In this manner an entire record can be generated and populated simply from the information within a document 320 (e.g., the data fields may be created and populated solely from the information in one or more documents).

As mentioned above, the records, sub-records, and/or data fields may be directly linked or tied together to form and show relationships between records, sub-records, and/or data fields. The unique ID for each record or sub-record may be used to directly link or tie records and/or sub-records together. For example, the record 302 shows the father data field associated with record 1 for Albert Brockman as being directly linked or tied to record 2. Thus, records 1 and 2 are directly linked or tied in a father-son relationship. Similarly, the mother data field and spouse data field associated with record 1 are directly linked or tied with records 3 and 4, respectively, to show a direct link or tie in a mother-son and spouse relationship, respectively. To make the direct links or connections, the data field may be selected and the unique ID may be manually input, such as by input the unique ID via a keyboard. Similarly, the connections or links may be made by selecting the data field and then selecting the record or sub-record, such as by clicking on the record or sub-record with a mouse pointer. Further, the connects or links may be made by selecting a word or phrase from the document 320 associated with the record to be linked. For example, the father data field may be selected and sub-record 2 selected from record 302 or the name "James" or "James Brockman" selected from document 320. The system may automatically recognize that selecting the name "James" while selecting a data field of record 1 indicates a direct link between the records or the link may be recognized by selecting the name while inputting a command from a keyboard, such as holding the ctrl key.

As records are directly linked or tied together, information about each record may be automatically generated. For example, the sex of record 2 may be automatically determined and input into the sex data field when record 2 is linked with record 1 in a father-son relationship. Record 2 may be highlighted to visually represent the determined information, such as by highlighting record 2 blue to show that the individual of record 2 is a male (or highlighting pink for the female). Likewise, the sex of record 3 may be determined and input into the appropriate data field when records 1 and 3 are linked together. Further, an association or relationship between records 2 and 3 may be implied from linking each of records 2 and 3 with record 1. For example, a relationship, such as a marriage relationship, may be implied when record 2 is linked in a father-child relationship with record 1 and record 3 is linked in a mother-child relationship with record 1. Based on the implied relationship, a query may be provided to the user to determine whether the relationship (i.e., marriage relationship) should populated in the corresponding data fields for records 2 and 3. Similarly, as records are linked with record 1 in a father-child relationship, the system may automatically associate a surname with the linked records and populate the corresponding data fields.

In addition, information can be copied and input from one or more other records, sub-records, or data fields. For example, the surname for each child can be copied from the surname for the parent or a different child. In one embodiment, the information from a data field directly above a record can be copied and input into the record by inputting a predefined key sequence, such as ctrl+c on the keyboard (e.g., the surname of a record directly above the selected record may be copied and input into the surname data field of the selected record).

One advantage among many of the present invention is the ability to quickly extract information from a document and enter that information into a record. A user merely needs to select a data field from the record and select a selectable region from the document (i.e., click on a word from the document). The system automatically obtains the information associated with selectable regions and populates the selected data field with the information (e.g., pastes the word into the data field). For example, if a record is selected to populate with information, the user could quickly enter information into each data field of the record by pressing the tab key on a keyboard to select between data fields and then by selecting a word or phrase from the document that corresponds with the selected data field. The entire record could be populated by pressing the tab key (or any other key) with one hand and traversing the document and selecting words with a mouse with the other hand. Further, the selected words or phrase may be highlighted to provide a visual display about what information has been input and into what data field the information was input. Further, the document or an image of the document with the highlighted words can be automatically created and/or stored with, or linked to, the record to provide the information's source. Information citations may be automatically generated as well. Further, the records may be tied or linked directly together and multiple records may be created and/or populated simultaneously.

When the word or phrase from the document is associated with a data field, the word or phrase may associated with a category of information. For example, when the word "Albert" is associated with the data field "given name," the word "Albert" may be associated with the category "first name." Similarly, when the word "son" is associated with the "sex" data field, the word "son" may be associated with the category of "male." Likewise the date of birth of Sep. 18, 1910 may be associated with the category "birth date." The information about the assigned categories for the document's words and/or phrases may be stored as data (e.g., metadata) within the document. Assigning or associating words or phrases within the document may render the document more searchable because a search can be conducted that includes both the word to search for and the category of the word. For example, a typical search may involve searching for the word "Albert" within a specified amount of words from the word "Brockman." Because the words are not assigned categories, the search engine cannot differentiate between any of the words "Albert" and "Brockman" within the document and will return all results that meet the defined criteria.

If, however, the word "Albert" has been associated with and/or assigned to the category "given name" and "Brockman" has been associated with and/or assigned to the category "surname," the search engine would be able to limit the search to the defined categories and thereby differentiate between the words "Albert" and "Brockman" within the document based on those words that have been assigned to those categories and those that have not. In other embodiments, the words or phrase in a document may be assigned categories of sales receipt, sales amount, purchaser, purchase date, employee, employee number, etc. to make a document more searchable. One advantage among many of the present invention is transforming an otherwise naked document into an enhanced searchable document by providing and/or assigning category information to the text of the document. The document may be considered a naked document because the document merely comprises text.

The document with the associated or assigned categories may be stored in a database with other documents to form a searchable database. The documents and/or database may be provided over a network so that remote users may search the documents and/or database. The network may be any type of network, including a virtual private network (VPN), the Internet, an Intranet, a wireless network, etc. A company or organization may render documents searchable in the manner described herein and/or maintain the database and charge a fee for user's to access and search the document's or database.

In one embodiment, the categories are not stored as data or metadata within the document, but the record and document are stored and linked together so that the information about the categories for the document's words and phrases are stored in the record. As the document is searched, the record may provide the information about the categories to limit the search and/or facilitate in differentiating between words and/or phrases as described above. In another embodiment, the search may be performed within the record to locate the words or phrases within a document or database. For example, the user can input information on a user interface about words or phrases to search in a document or database. The search engine may then access a record and use the input information to locate the desired words or phrases. After locating the words or phrases in the record, the corresponding document(s) may be obtained and provided to the user with or without the words or phrases highlighted. In addition to the embodiments described above, the search may also involve a combination of searching the document and the record simultaneously.

Figure 4:
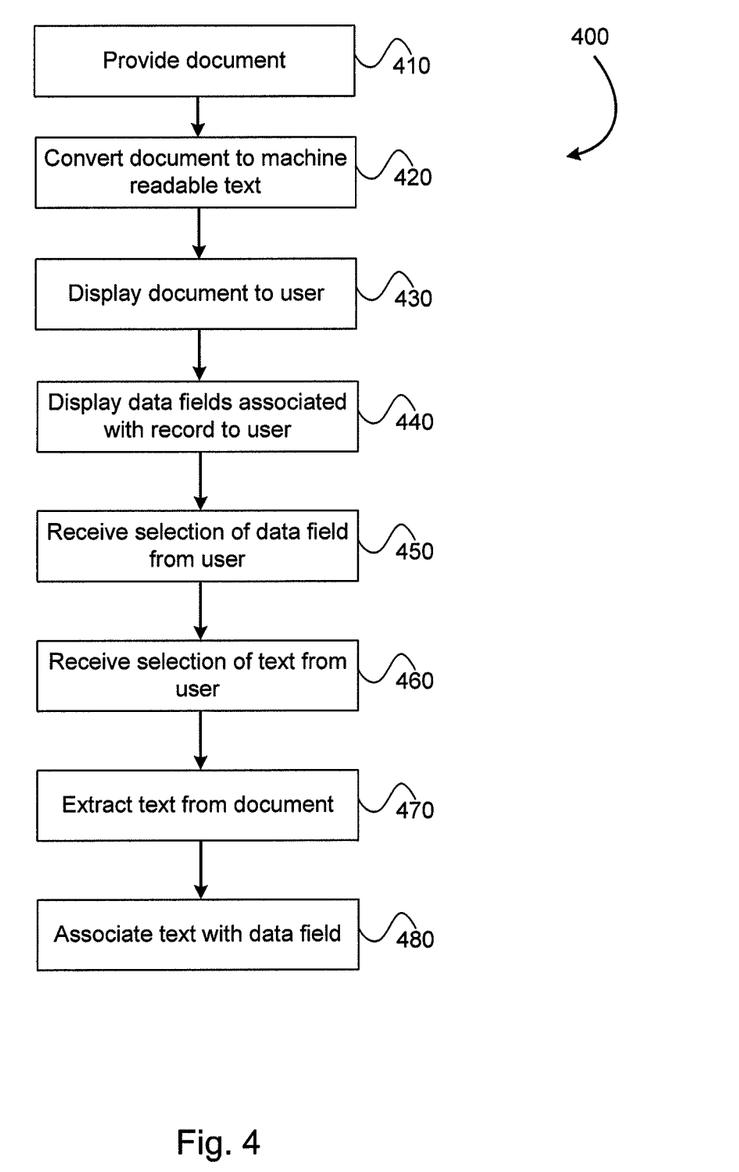
FIG. 4 is a method for extracting information from a document and creating a record according to an embodiment of the invention.

With reference to FIG. 4, illustrated is a method 400 for extracting information from one or more documents. The extracted information may be used to create a record, such as a genealogical or ancestral record or any other type of record. The method 400 may include providing a document to a computing system (block 410), such as central computing system 102 or additional computing system 120. Providing a document to a computing system may include scanning the document using a scanner, photocopying the document using a photocopying machine, photographing the document using a camera, or any other method of providing a copy or image of the document to a computing system. The document may be provided from one or more of the following sources: a book, a birth and/or death certificate, a census record, an article, notes, a public record, a sales record, an employee record, a historical record, a newspaper article or column, a transcript, a school record, etc. In one embodiment, the document includes non-machine readable text. In another embodiment, the document includes machine readable text, such as an online article or newspaper column.

At block 420, the text of the document may be converted into a machine readable format, such as through a character optical recognition program (OCR). Converting the text into a machine readable format may include determining individual characters of the text and defining an area or boundary around the individual characters. It may also include determining individual words or phrases from the individual characters and defining an area or boundary around each of the words or phrases. Defining the area around each of the words or phrases may include joining the area or boundary around each of the individual characters. The area or boundary around the words or phrases may be rectangular in shape and may fully encompass or enclose the word or phrase. The boundary or area may form a selectable region around each of the words or phrases that a user can select by placing a mouse pointer within the boundary and clicking within the boundary (e.g., by selecting a word or phrase in the text).

At block 430, the document with machine readable text may be displayed to a user so that the information from the document may be extracted and/or populated within a record. Displaying the document may include displaying the document on a display device 108, such as an LCD screen, plasma screen, wireless device, etc. At block 440, one or more data fields associated with a record may be displayed to a user. The data fields may be configured to receive information extracted from the document and store the information. For example, each data field may be populated with information as described above. At block 450, a selection of a data field may be received from the user. For example, in a genealogical record, the user may select the "given name" data field to populate with an individual's first name. Selecting the data field may include clicking on a data field with a mouse pointer, pressing various keys or key configurations (i.e., alt+d) on a keyboard, or pressing the tab key and/or any other key to scroll between data field. At block 460, a selection of a word or phrase from the document may be received from the user. Receiving a selection of a word or phrase may include clicking within a selectable region or area associated with a word or phrase, pressing one or more keys on a keyboard, etc., as described herein.

At block 470, information associated with the selected word or phrase may be extracted from the document. For example, in the region or area associated with the name "Albert" is selected, the system may recognize that the user is requesting the information associated with that region or area. In response, a copy of the individual characters of the name "Albert" may be provided to the memory of the computing system for subsequent population into one or more data fields and/or the individual characters may be automatically populated into one or more pre-selected or automatically selected data fields. Further, the information may be normalized prior to populating one or more data fields as described above. The selectable region or area and/or the selected text may be highlighted to visual display what information has been selected and/or to display an association between the information and the selected data field(s). At block 480, the extracted information may be associated with one or more data fields, such as by populating the data field with the extracted information.

Figure 5:
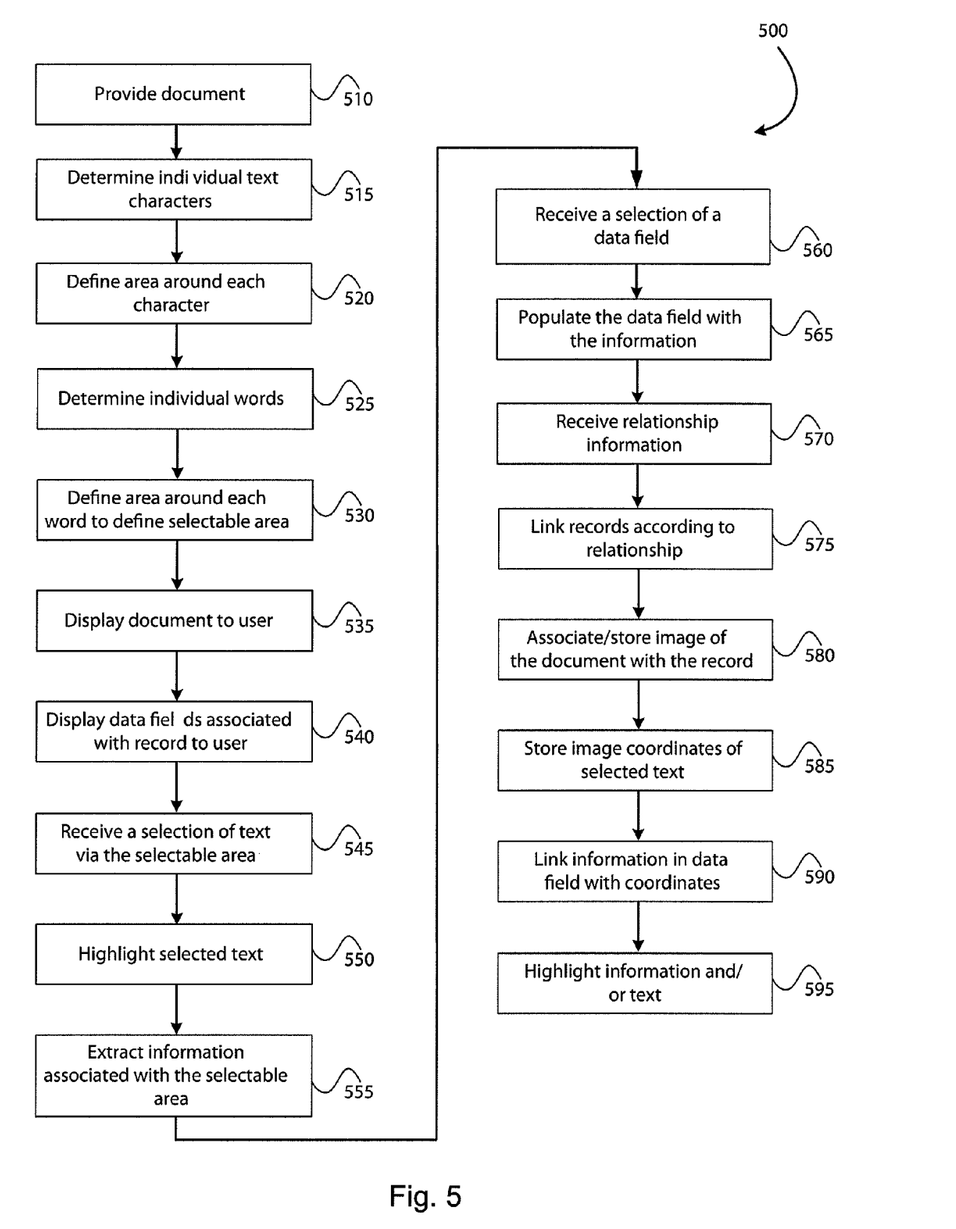
FIG. 5 is a method for extracting information from a document and creating a record according to another embodiment of the invention.

With reference to FIG. 5, illustrated is another method 500 for extracting information (e.g., genealogical information) from a document and creating a record. At block 510, a document may be provided comprising text. The document may be provided as described previously and the text may include genealogical information or data and/or other information (sales records, employee records, etc.). At block 515, the text of the document may be converted into a machine readable format, such as by determining or recognizing individual characters of the text as described above. At block 520, an area or boundary may be defined around each of the individual characters of the text. The area or boundary may define selectable regions around each of the characters. At block 525, individual words and/or phrases may be determined or recognized from the machine readable text. At block 530, an area or boundary may be defined around each word and/or phrase of the document to form a selectable region (e.g., selectable rectangle) around or proximate to each of the words and/or phrases. At block 535, the document may be displayed with the text in the machine readable format. For example, the document may be displayed on display device 108 to a user 114. The document may include genealogical data about one or more individuals and/or include familial or other types of relationships between individuals and/or data. At block 540, one or more data fields associated with a record may be displayed. The record may be a genealogical record associated with one or more individuals and one or more of the data fields may store genealogical information about the individual.

At block 545, a selection of text (or multiple selections of text) may be received by, for example, a selection of the selectable area or region. The selected text may include genealogical and/or other information about one or more of the individuals associated with the genealogical record. At block 550, the selected text may be highlighted to visually display the selected text as described above. The highlighting may depend on the information associated with the selected area and/or the data field that the information is associated with. Further, one or more data fields may be highlighted to show an association between the selected text and the data field(s). At block 555, the information associated with the selectable area or region may be extracted from the document, such as by copying the characters or words associated with the area. At block 560, one or more data fields may be selected. At block 565, the selected data field(s) may be populated with the information extracted from the selectable area or region. In this manner a genealogical record of one or more individuals may be populated with information about the one or more individuals.

At lock 570, a relationship between individuals and/or data may be determined and/or relationship information may be received. For example, determining a relationship between individuals and/or data may include determine that individuals within the record have a familial relationship, such as a father and son or some other type of relationship. The relationships may be determined from the document and/or inferred through other relationships (e.g., if two individuals have the same mother and father, the system may infer a sibling relationship). Receiving relationship information may include receiving information from the document and/or input by a user that specifies a relationship between individuals and/or data. For example, the user may select from the document the name "Albert" followed by the text "son of" and then the name "James" to show a father-son relationship between the identified individuals. The system may recognize that the text "son of" specifies such a relationship and/or the text may be assigned as a father-son designator by the user so that such relationships may be directly input from the document. Determining a relationship and/or receiving relationship information may further involve a unique ID that is used to directly establish such relationships and that may be provided by the user, such as by keying in the ID to a data field or clicking on the ID or record associated with an ID with a mouse pointer.

At block 575, the records, sub-records, and/or data fields may be directly linked according to the relationship. For example, if a father-son relationship is determined as described in the above paragraph, the records can be linked so that James is directly linked to Albert as Albert's father. The relationship and link may be visually displayed, such as in record tree view 330. In one embodiment, the records may be directly linked by populating a data field with the unique ID of another record or sub-record, such as by populating a son record's "father" data field with the unique ID of a father record. In another embodiment, the relationship is inferred and the data field (i.e., father data field) is automatically populated or the relationship is directly input from the document as described above and that data field is populated directly from the document (e.g., the user clicks on the name "James" or the word "son of" followed by "James").

At block 580, an image of the document (or the document itself) may be associated or otherwise linked with the record to provide a source for the information within the record. The defined area or region around one or more words or phrases may also be stored. At block 585, the coordinates of the text selected from the document (i.e., the coordinates of the text that populates one or more of the data fields) in relation to the image may be stored. The coordinates may be stored as data and/or metadata in the image file. At block 590, the information in the data fields may be associated or otherwise linked with the corresponding text in the image. For example, the information in the data fields may point to one or more of the stored coordinates that corresponds with the text from which the information was extracted. Citation information for the source document may also be generated and/or linked with the information in data field and/or with the record. The citation information may include document and/or page number, title of the document (e.g., book title), publication information, author, etc.

At block 595, the text in the image and/or one or more corresponding data fields may be highlighted to visually display the source of the data field's information on the image. Highlighting the text on the image may include highlighting the defined area or region. Further, the highlighting may be done in response to receiving a selection of the information in the data field (i.e., clicking on data field) and inputting a request to view the source of the information. In response, the image (or document itself) may be provided with the corresponding text highlighted. The text may be permanently highlighted or the highlighting may be hidden until a user selects a corresponding data field. Highlighting the data field and/or images text in this manner removes the burden on the user to search the document for the information within the data field.

The text in the document may further be assigned a category of information. This may automatically occur as data fields are being populated. The category may facilitating in searching the document by refining and/or restricting search functions as described above. The document may be stored on a searchable database. The document may subsequently be provided over a network so that other users may search the document for information.

Figure 6:
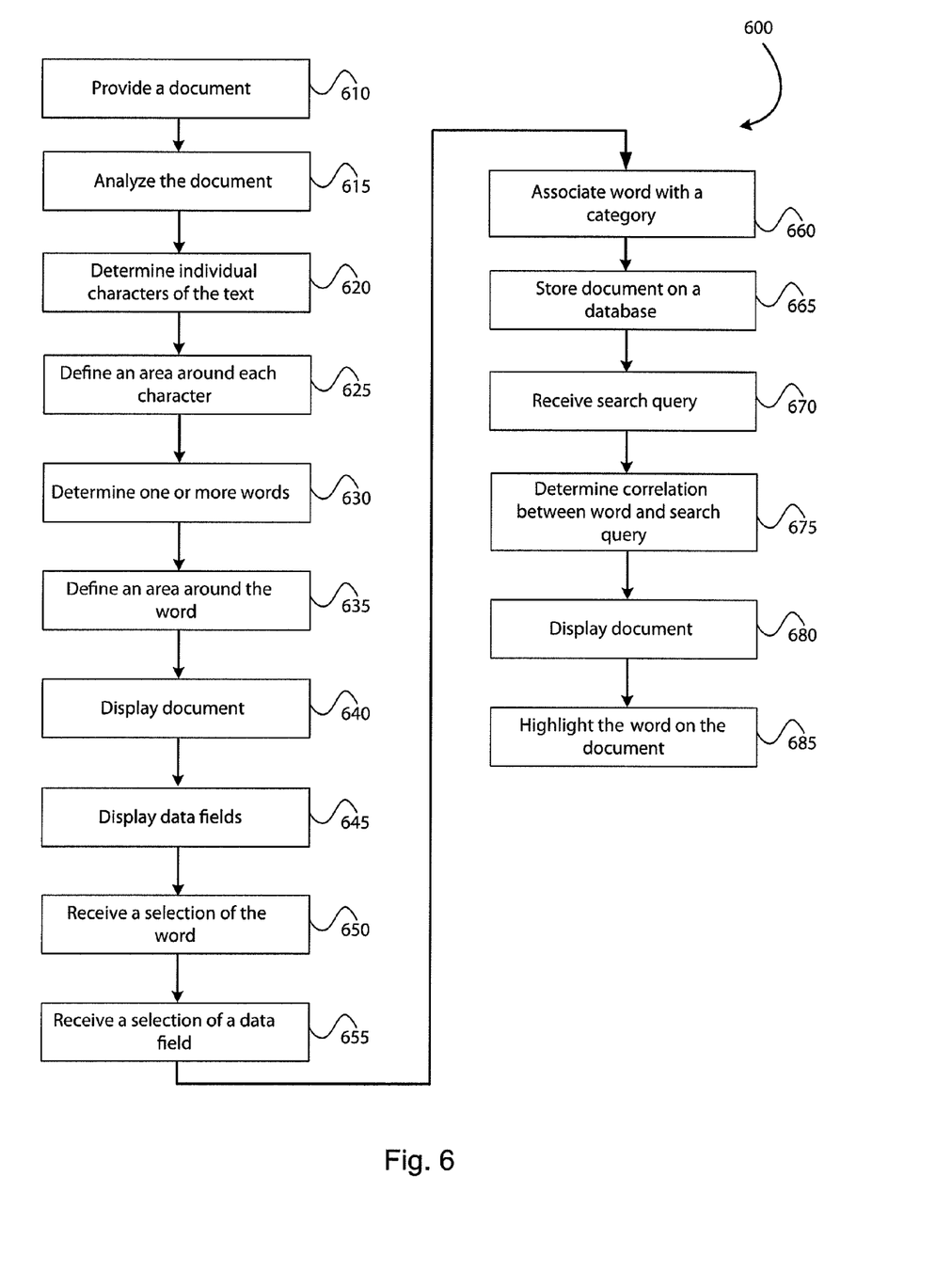
FIG. 6 is a method for providing a searchable document over a network according to an embodiment of the invention.

With reference to FIG. 6, illustrated is a method for providing a searchable document over a network comprising. At block 610, a document may be provided as described above. The document may comprise text in a non-machine readable or a machine readable format. At block 615, the document may be analyzed or recognized by the system to convert the text from a non-machine readable text into machine readable text, such as by determining individual characters and/or words or phrases. At block 620, individual characters may be determined or otherwise recognized from the text. At block 625, an area may be defined around each of the individual characters. The area may define a selectable region for each character. At block 630, one or more words or phrases may be determined or otherwise recognized from the text and/or individual characters. At block 635, an area may be defined around each word or phrase to define a selectable region around each word or phrase. At block 640, the document with machine readable text may be displayed.

At block 645, one or more data fields associated with a record may be displayed. At block 650, a selection of a word or phrase from the document may be received, such as by selecting the selectable text. Selecting the selectable region (i.e., mouse clicking within the selectable region), may select the entire word or phrase. At block 655, a selection of one or more data fields to associate or populate with the selected word or phrase may be received. At block 660, the selected word(s) or phrase(s) may be associated with a category as previously described. The category may facilitate in locating the word(s) or phrase(s) on the document. In one embodiment, the word(s) or phrase(s) and the assigned category is stored as data or metadata within the document. In another embodiment, the record is linked with the document, where the data fields provide the category information for the words or phrases. At block 665, the document and/or record is stored on a database. At block 670, a search query is received from a user or system performing a search. The search may be performed over a network from a user at a remote location. The search query may include search information, such as a series or words or phrases to search for in the database along with category information for the words or phrases.

At block 675, a correlation is determined between the search information and the word or phrase in the document and the category assigned to the word or phrase. For example, the search information may specify to search for the name Albert and may specify that Albert is an individual's first name. A correlation may be determined between that search information and a word Albert within the document that is assigned the category first name. The category may differentiate between words within the document (e.g., may differentiate between the word "Albert" that refers to a person's first name in one part of the document and a location or company in another part of the document).

At block 680, the document may be displayed or otherwise provided to the user or system performing the search in response to determining that the search information, category, and word or phrase correlate. At block 685, the word or phrase on the document may be highlighted to visual display the word or phrase to the user or system. Highlighting the word or phrase may include highlighting the defined area or region around the word or phrase.

Figure 7:
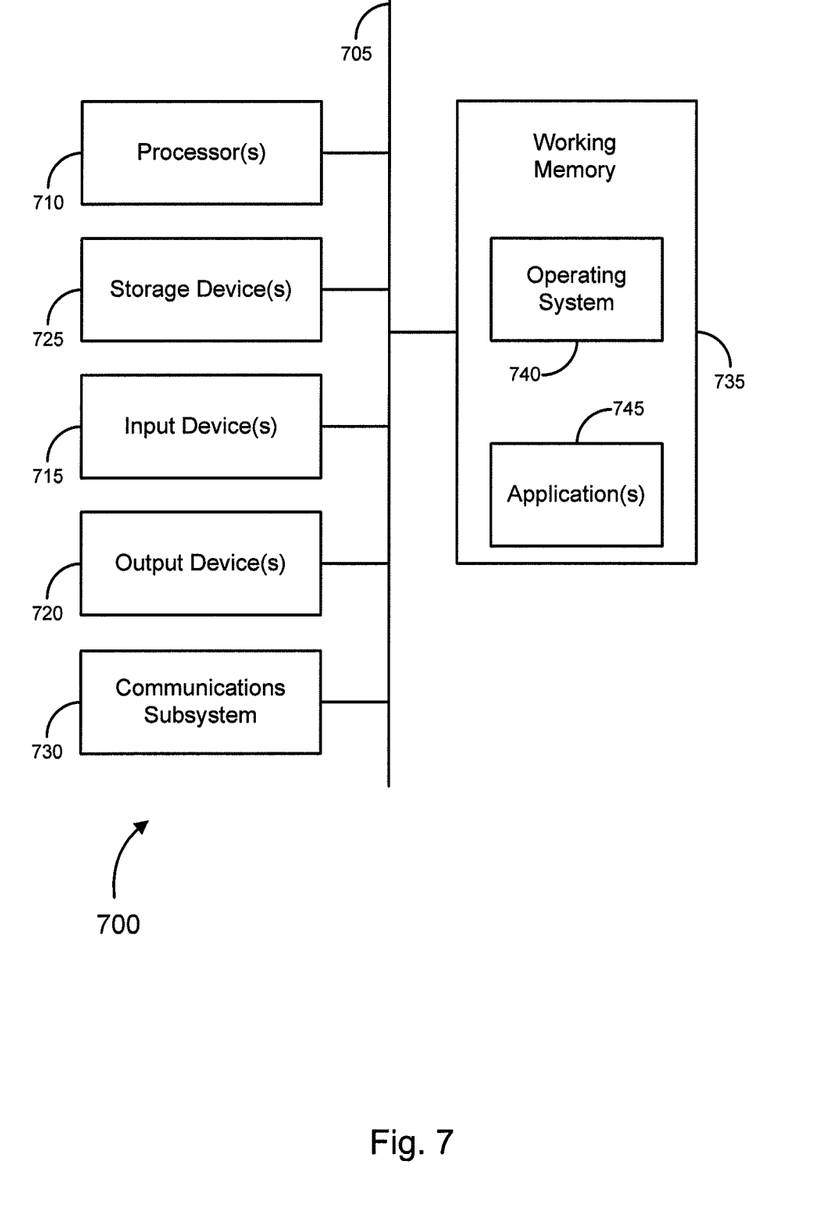
FIG. 7 is a simplified diagram of a computer system that may be used to extract information from a document and create a record according to an embodiment of the invention.

With reference to FIG. 7, illustrated is a schematic of one embodiment of a computer system 700 that can perform the methods of the invention, as described herein. For example, the computer system can function as a system to extract information from a document and create one or more records from the extracted information. It should be noted that FIG. 7 is meant only to provide a generalized illustration of various components, any or all of which may be utilized as appropriate. FIG. 7, therefore, broadly illustrates how individual system elements may be implemented in a relatively separated or relatively more integrated manner.

The computer system 700 is shown comprising hardware elements that can be electrically coupled via a bus 705 (or may otherwise be in communication, as appropriate). The hardware elements can include one or more processors 710, including, without limitation, one or more general-purpose processors and/or one or more special-purpose processors (such as digital signal processing chips, graphics acceleration chips, and/or the like); one or more input devices 715, which can include, without limitation, a mouse, a keyboard and/or the like; and one or more output devices 720, which can include, without limitation, a display device, a printer and/or the like.

The computer system 700 may further include (and/or be in communication with) one or more storage devices 725, which can comprise, without limitation, local and/or network accessible storage and/or can include, without limitation, a disk drive, a drive array, an optical storage device, a solid-state storage device, such as a random access memory ("RAM") and/or a read-only memory ("ROM"), which can be programmable, flash-updateable and/or the like. The computer system 700 might also include a communications subsystem 730, which can include without limitation a modem, a network card (wireless or wired), an infra-red communication device, a wireless communication device and/or chipset (such as a Bluetooth™ device, an 802.11 device, a WiFi device, a WiMax device, cellular communication facilities, etc.), and/or the like. The communications subsystem 730 may permit data to be exchanged with a network, and/or any other devices described herein. In many embodiments, the computer system 700 will further comprise a working memory 735, which can include a RAM or ROM device, as described above.

The computer system 700 can also comprise software elements, shown as being currently located within the working memory 735, including an operating system 740 and/or other code, such as one or more application programs 745, which may comprise computer programs of the invention, and/or may be designed to implement methods of the invention and/or configure systems of the invention, as described herein. Merely by way of example, one or more procedures described with respect to the method(s) discussed above might be implemented as code and/or instructions executable by a computer (and/or a processor within a computer). A set of these instructions and/or code might be stored on a computer readable storage medium, such as the storage device(s) 725 described above. In some cases, the storage medium might be incorporated within a computer system, such as the system 700. In other embodiments, the storage medium might be separate from a computer system (e.g., a removable medium, such as a compact disc, etc.), and or provided in an installation package, such that the storage medium can be used to program a general purpose computer with the instructions/code stored thereon. These instructions might take the form of executable code, which is executable by the computer system 700 and/or might take the form of source and/or installable code, which, upon compilation and/or installation on the computer system 700 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection with other computing devices such as network input/output devices may be employed.

In one aspect, the invention employs a computer system (such as the computer system 700) to perform methods of the invention. According to a set of embodiments, some or all of the procedures of such methods are performed by the computer system 700 in response to processor 710 executing one or more sequences of one or more instructions (which might be incorporated into the operating system 740 and/or other code, such as an application program 745) contained in the working memory 735. Such instructions may be read into the working memory 735 from another machine-readable medium, such as one or more of the storage device(s) 725. Merely by way of example, execution of the sequences of instructions contained in the working memory 735 might cause the processor(s) 710 to perform one or more procedures of the methods described herein.

The terms "machine-readable medium," "computer-readable medium," and "computer-readable storage medium," as used herein, refer to any medium that participates in providing data that causes a machine to operate in a specific fashion. In an embodiment implemented using the computer system 700, various machine-readable media might be involved in providing instructions/code to processor(s) 710 for execution and/or might be used to store and/or carry such instructions/code (e.g., as signals). In many implementations, a computer readable medium is a physical and/or tangible storage medium. Such a medium may take many forms, including but not limited to, non-volatile media, volatile media, and transmission media. Non-volatile media includes, for example, optical or magnetic disks, such as the storage device(s) 725. Volatile media includes, without limitation, dynamic memory, such as the working memory 735. Transmission media includes coaxial cables, copper wire, and fiber optics, including the wires that comprise the bus 705, as well as the various components of the communication subsystem 730 (and/or the media by which the communications subsystem 730 provides communication with other devices). Hence, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700. These signals, which might be in the form of electromagnetic signals, acoustic signals, optical signals and/or the like, are all examples of carrier waves on which instructions can be encoded, in accordance with various embodiments of the invention.

The communications subsystem 730 (and/or components thereof) generally will receive the signals, and the bus 705 then might carry the signals (and/or the data, instructions, etc., carried by the signals) to the working memory 735, from which the processor(s) 705 retrieves and executes the instructions. The instructions received by the working memory 735 may optionally be stored on a storage device 725 either before or after execution by the processor(s) 710.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware and/or software configuration. Similarly, while various functionality is ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A system for extracting genealogical information from one or more documents, the system comprising:
    a memory device having a set of instructions stored thereon;
    a communication interface; and
    a processor communicatively coupled with the memory device and the communication interface, wherein the set of instructions cause the processor to perform the method comprising:
    providing multiple, separate documents, each comprising text including genealogical data;
    converting the text into a machine readable format;
    displaying the multiple documents with the text in the machine readable format simultaneously with a plurality of genealogical records and a hierarchical structure, wherein each one of the displayed genealogical records is associated with a particular individual and includes a plurality of data fields each configured to display and store information about an associated individual, and the hierarchical structure includes a parent node associated with one of the displayed genealogical records and at least one node branching from the parent node associated with another one of the displayed genealogical records;
    receiving a selection of a first portion of text from at least one of the multiple documents, wherein the first portion of text comprises information about an individual;
    highlighting the first portion of text on the at least one the multiple documents;
    extracting information associated with the first portion of text from the at least one the multiple documents;
    receiving a selection of a data field of a particular one of the displayed genealogical records to associate with the extracted information;
    in response to receiving the selection of the data field of the particular one of the displayed genealogical records, normalizing the extracted information so that the information comprises a defined format for the selected data field; populating the data field with the extracted information; updating the displayed hierarchical structure to include a parent node associated with the particular one of the displayed genealogical records, and at least one node branching from the parent node associated with another particular one of the displayed genealogical records; and checking consistency between the highlighted portions of the text in each of the displayed multiple documents and the extracted information populating the data field, by highlighting corresponding portions of text on each of the displayed multiple documents and determining whether the highlighted portions of text on each of the displayed multiple documents is the same as extracted information populating the data field;

associating the first portion of text with a category, wherein the category facilitates locating the first portion of text during a search; and providing the at least one of the multiple documents over a network so that one or more remote user can perform a search for information on the document.

2. The system according to claim 1, wherein the method further comprises:
   receiving relationship information that identifies a relationship between the individual and an additional individual; and
   linking the individual with the additional individual according to the relationship.

3. The system according to claim 2, wherein linking the individual with the additional individual comprises populating an additional data field with a unique identifier associated with the additional individual.

4. The system according to claim 1, wherein converting the text into machine readable format comprises:
   determining individual characters of the text;
   determining a word or phrase comprised of the individual characters; and
   defining an area around the word or phrase to form a selectable region on the document.

5. The system according to claim 1, wherein receiving a selection of the first portion of text comprises receiving a selection of the selectable region.

6. The system according to claim 1, wherein the method further comprises highlighting the data field to show an association between the first portion of text and the data field.

7. The system according to claim 1, wherein the method further comprises:
   receiving a selection of a second portion of text from the user;
   determining that the second portion of text comprises information generally associated with data field categories; and
   generating an additional data field based on the second portion of text.

8. The system according to claim 1, wherein the method further comprises:
   associating an image of the document with the record;
   storing the coordinates of the first portion of text in relation to the image;
   linking the extracted information in the data field with the first portion of text in the image; and
   storing the image to provide a source for the extracted information in the data field.

9. The system according to claim 1, wherein the method further comprises:
   receiving a selection of the extracted information in the data field from the user; and
   providing the stored image to the user, wherein the first portion of text is highlighted in the image to visually display the source of the extracted information.

10. The system according to claim 1, wherein providing the document comprises one or more selected from the group consisting of:
    scanning the document;
    photocopying the document; and
    photographing the document;
    and wherein the source of the document comprises one or more selected from the group consisting of:
    a book;
    a letter or other correspondence;
    a journal;
    a diary;
    a will;
    a death certificate;
    a birth certificate;
    a census record;
    an article;
    a notes;
    a public record; and
    a genealogical document.

11. A non-transitory computer-readable medium having a set of instructions stored thereon which, when executed by a computer, cause the computer to:
    receive multiple documents, each document comprising non-machine readable text, wherein the non-machine readable text comprises genealogical data;
    convert the text into a machine readable format;
    display the multiple, separate documents with the text in the machine readable format simultaneously with a plurality of genealogical records and a hierarchical structure, wherein each one of the displayed genealogical records is associated with a particular individual and includes a plurality of data fields each configured to display and store information about an associated individual, and the hierarchical structure includes a parent node associated with one of the displayed genealogical records and at least one node branching from the parent node associated with another one of the displayed genealogical records;
    receive a selection of a first portion of text from at least one of the multiple documents, wherein the first portion of text comprises information about an individual;
    highlight the first portion of text on the at least one the multiple documents;
    extract, from the at least one the multiple documents, information associated with the first portion of text;
    receive a selection of a data field of a particular one of the displayed genealogical records to associate with the extracted information;
    in response to the selection of the data field of the particular one of the displayed genealogical records, normalize the extracted information so that the information comprises a defined format for the selected data field; populate the data field with the extracted information; update the displayed hierarchical structure to include a parent node associated with the particular one of the displayed genealogical records, and at least one node branching from the parent node associated with another particular one of the displayed genealogical records; and check consistency between the highlighted portions of the text in each of the displayed multiple documents and the extracted information populating the data field, by highlighting corresponding portions of text on each of the displayed multiple documents and determining whether the highlighted portions of text on each of the displayed multiple documents is the same as extracted information populating the data field;
    associate the first portion of text with a category, wherein the category facilitates locating the first portion of text during a search; and
    provide at least one of the multiple documents over a network so that one or more remote user can perform a search for information on the document.

12. The non-transitory computer-readable medium of claim 11, wherein the instructions further cause the computer to:
    receive relationship information that identifies a relationship between the individual and an additional individual; and link the individual with the additional individual according to the relationship.

13. The non-transitory computer-readable medium of claim 11, wherein the instructions to convert the text into machine readable format cause the computer to:
   determine individual characters of the text;
   determine a word or phrase comprised of the individual characters; and
   define an area around the word or phrase that forms a selectable region on the document.

14. The non-transitory computer-readable medium of claim 11, wherein the instructions further cause the computer to:
   associate an image of the document with the record;
   store the coordinates of the first portion of text in relation to the image;
   link the extracted information in the data field with the first portion of text in the image; and
   store the image to provide a source for the extracted information in the data field.

15. The non-transitory computer-readable medium of claim 14, wherein the instructions further cause the computer to:
   receive a selection of the extracted information in the data field from the user; and
   provide the stored image to the user, wherein the first portion of text is highlighted in the image to visually display the source of the extracted information.

* * * * *